United States Patent

[11] 3,538,971

| [72] | Inventor | Wayne R. Stewart<br>Hutchinson, Kansas |
|---|---|---|
| [21] | Appl. No. | 749,413 |
| [22] | Filed | Aug. 1, 1968 |
| [45] | Patented | Nov. 10, 1970 |
| [73] | Assignee | The Pulaski Rubber Company<br>Pulaski, Tennessee |

[54] PLANTER WHEEL TIRE HAVING SOIL PINCHING STRUCTURE
8 Claims, 4 Drawing Figs.

[52] U.S. Cl. .................................................. 152/352
[51] Int. Cl. ..................................................... B60c 11/04
[50] Field of Search ............................................. 152/352,
353, 209; 111/85, (Methods); 172/519, 540

[56] References Cited
UNITED STATES PATENTS

| 3,181,622 | 5/1965 | Adams et al. .................. | 172/519 |
| 3,207,234 | 9/1965 | Stewart ......................... | 152/352X |

*Primary Examiner*—James P. Marbert
*Attorney*—Schmidt, Johnson, Hovey, Williams & Chase ABSTRACT: A hollow, deformable tire for farm implement press wheels has a median depressed area therearound, bounded by a pair of increased thickness, circumferential ribs, together with inclined marginal areas therearound, operable while in engagement with the soil and during tire deflection to pinch the furrow shut, tightly around the seed, presenting a mound of loose soil over the seed. Each rib is traversed by a continuous row of spaced, oblique bars extending across the adjacent marginal edge to a sidewall of the tire and across one half of the median area to the center line of the tire for fracturing the crust of the soil on both sides of the mound.

Patented Nov. 10, 1970

3,538,971

INVENTOR
Wayne R. Stewart

BY Schmidt, Johnson, Hovey,
Williams & Bradley,
ATTORNEYS.

3,538,971

PLANTER WHEEL TIRE HAVING SOIL PINCHING STRUCTURE

It is an important object of my present invention to provide a tire for farm implement press wheels that is capable of creasing the furrow shut, tightly around the seed, leaving the surface soil on top of the seed in a loose mound, thereby insuring positive germination action, with quicker plant emergence.

Another important object of the instant invention is the provision of a tire of the aforementioned nature that is capable of fracturing the crust of even the tightest of soils on both sides of the mound, thereby holding plant emergence within the row and causing quick earlier growth, with solid stands and hardier plants.

Figure 2:
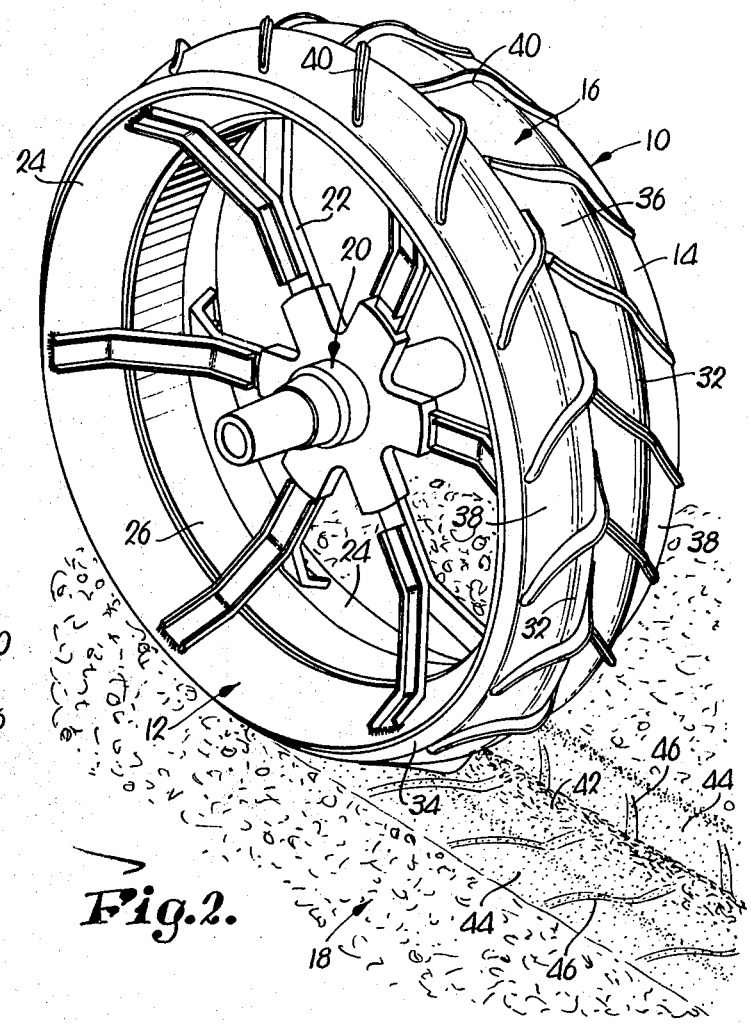
FIG. 2 is a perspective view showing the tire mounted on the wheel and illustrating the effect thereof on the soil.
Figure 3:
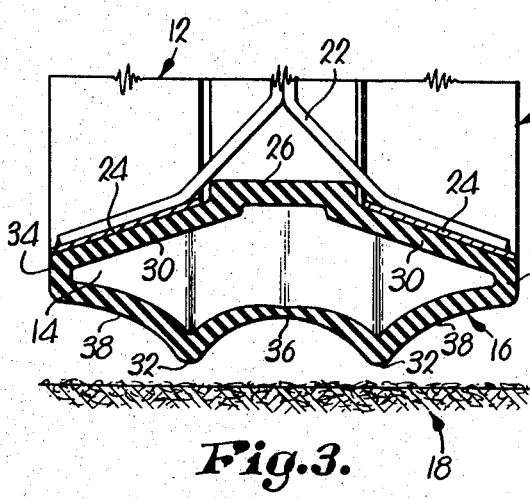
FIG. 3 is a fragmentary cross-sectional view through the wheel and tire shown in FIG. 2, the section being taken circumferentially remote from the surface of the soil.
Figure 4:
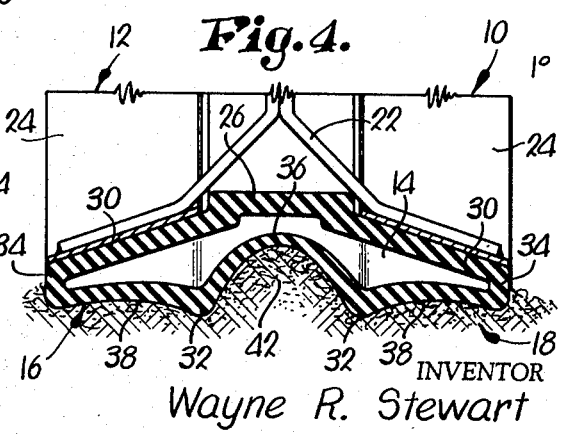
FIG. 4 is a cross-sectional view similar to FIG. 3 illustrating the deformation of the tire casing during engagement with the soil.

Tire 10, shown in FIGS. 2—4, mounted on a farm implement press wheel 12 includes a continuous casing 14 of deformable material such as rubber having a surface 16 there around adapted to contact soil 18.

Wheel 12, chosen for purposes of illustrating the novel features of tire 10, has a hub 20 provided with Y-shaped spokes 22 rigidly secured to a pair of spaced rims 24 which slope in diverging relationship as their outermost peripheral edges are approached.

The hollow casing 14 has a continuous innermost band 26 disposed between the innermost peripheral edges of the rims 24 and continuing into a pair of opposed inclined inner walls 30 which bear flatly against the rims 24.

Surface 16 is provided with a pair of spaced annular ribs 32 circumscribing the casing 14 in parallelism with a pair of annular side walls 34 joining integrally with proximal walls 30. The ribs 32 are equally spaced outwardly from the center line of the surface 16 in the direction of rotation of tire 10 and there is provided an annular transversely depressed median area 36 spanning the distance between the ribs 32. The median area 36 surrounds the casing 14 and is arcuately concave transversely thereof.

The surface 16 is provided additionally with a pair of continuous marginal areas 38 which also surround the casing 14. The areas 38 extend away from the ribs 32 at an acute, substantially horizontal angle, span the distance between corresponding sidewalls 34 and proximal ribs. Both of the areas 38 slope outwardly as their proximal ribs 32 are approached. Each sidewall 34 joins integrally with its corresponding marginal area 38 remote from the ribs 32 forming an apex about which the marginal area 38 hingedly swings inwardly to a horizontal position lying flatly on the surface 16 as the latter moves into engagement with the soil 18 and as the casing 14 deflects.

As in the case of the median area 36, the marginal areas 38 are arcuately concave transversely thereof, but the concavity of the median area 36 is appreciably wider and deeper than the concavities of the two marginal areas 38.

Figure 1:
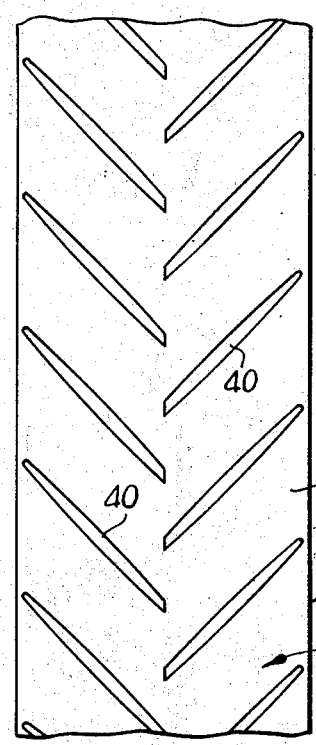
FIG. 1 is a fragmentary elevational view of the soil-contacting surface of a planter wheel tire having soil-pinching structure made pursuant to my present invention.

A circumferential row of spaced fracture bars 40, traversing each rib 32 respectively is provided on surface 16, with the height of each bar 40 progressively increasing as its rib 32 is approached. As noted in FIGS. 1 and 2, the bars 40 of one of the ribs 32 extend obliquely thereacross in one direction and the bars 40 of the other rib 32 extend obliquely thereacross in the opposite direction. The inner ends of all of the bars 40 terminate at the center line of surface 16 and the outer ends of the bars 40 terminate at the corresponding sidewall 34.

By virtue of the hollow nature of the casing 14 the median area 36 circumferentially recedes inwardly and the ribs 32 move toward each other during engagement of the surface 16 with the soil 18 and consequent deflection of the casing 14.

The pattern thus formed in the soil 18 is illustrated in FIG. 2, leaving the surface soil on top of the seed in a loose mound 42 which cannot crust over. The action in producing the mound 42 is seen in FIG. 4 demonstrating the way in which the furrow is creased shut by a pinching action tightly round the seed. At the same time, as the marginal areas 38 press the soil 18 to provide strips 44 in soil 18 along each side of the mound 42, the bars 40 fracture the crust in both strips 44, presenting lines of fracture 46 spaced along each strip 44 respectively.

Accordingly, it can now be seen how the novel tire of the instant invention results in positive seed germination action, quicker plant emergence, earlier growth, solid stands and hardier plants.

I claim:

1. A tire for farm implement press wheels comprising:

a continuous casing of deformable material having a soil-contacting surface therearound;

said surface being provided with a pair of spaced, annular ribs circumscribing the casing, one of said ribs on each side of the center line of said surface in the direction of tire rotation;

said surface having an annular, transversely depressed, median area spanning the distance between said ribs and surrounding said casing;

said surface having a pair of continuous marginal areas joined to the respective annular ribs and normally extending laterally from the ribs at an acute substantially horizontal angle;

means joining said marginal areas with said casing remote from the ribs whereby the marginal areas swing inwardly to a horizontal position lying flatly on said surface of the soil; and said casing being hollow to permit said median area to circumferentially recede inwardly and said ribs to move toward each other during engagement of said surface with the soil and consequent deflection of said casing.

2. A tire as set forth in claim 1, said means comprising:

a pair of opposed, annular sidewalls;

said marginal areas sloping outwardly as their proximal ribs are approached; and each sidewall being integrally joined with a corresponding marginal area and forming an apex therewith.

3. A tire as set forth in claim 2, each of said marginal areas and said median area being arcuately concave transversely thereof.

4. A tire as set forth in claim 1 and a circumferential row of spaced fracture bars traversing each rib respectively.

5. A tire as set forth in claim 4, the height of each bar progressively increasing as its rib is approached.

6. A tire as set forth in claim 5, each bar terminating at said center line.

7. A tire as set forth in claim 2 including:

a circumferential row of spaced fracture bars traversing each rib respectively; and said bars extending obliquely from said center line to corresponding side walls.

8. A tire as set forth in claim 2 including:

a circumferential row of spaced fracture bars traversing each rib respectively;

the bars of one of the ribs extending obliquely thereacross in one direction, with the outer ends thereof terminating at one of said side walls, and the bars of the other rib extending obliquely thereacross in the opposite direction, with the outer ends thereof terminating at the other side wall;

the inner ends of the bars terminating at said center line; and said inner ends of one row of bars being spaced from and alternating with said inner ends of the other row of bars.